US012206320B2

United States Patent
Huang et al.

(10) Patent No.: US 12,206,320 B2
(45) Date of Patent: Jan. 21, 2025

(12) United States Patent

(54) ADAPTIVE INDUCTOR DCR CURRENT SENSING CIRCUIT IN A SWITCHING CONVERTER AND ASSOCIATED METHOD

(71) Applicant: Chengdu Monolithic Power Systems Co., Ltd., Chengdu (CN)

(72) Inventors: Chun Shih Huang, New Taipei (CN); Chia Chun Hsiao, New Taipei (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 230 days.

(21) Appl. No.: 17/686,853

(22) Filed: Mar. 4, 2022

(65) Prior Publication Data

US 2022/0294330 A1 Sep. 15, 2022

(30) Foreign Application Priority Data

Mar. 11, 2021 (CN) ........................ 202110266737.8

(51) Int. Cl.
*H02M 1/00* (2007.01)
*H02M 3/158* (2006.01)

(52) U.S. Cl.
CPC ......... *H02M 1/0009* (2021.05); *H02M 3/158* (2013.01)

(58) Field of Classification Search
CPC .................................................. H02M 1/0009
See application file for complete search history.

(56) References Cited

U.S. PATENT DOCUMENTS 8,072,200 B1 * 12/2011 Qiu ..................... H02M 3/1584 323/907
9,660,516 B2 5/2017 Fogg
9,977,088 B2 5/2018 Zhao et al.
10,254,314 B1 4/2019 Li
10,348,185 B1 * 7/2019 Michal .............. H02M 3/33507
2003/0111984 A1 * 6/2003 Isham .................... G01R 31/40 323/271
2009/0198460 A1 * 8/2009 Carroll ................ H02M 3/1584 702/60
2010/0320974 A1 * 12/2010 Manlove .............. H02M 3/157 323/222
2012/0049825 A1 * 3/2012 Chen ..................... H02M 3/156 323/284

(Continued)

FOREIGN PATENT DOCUMENTS

CN 1605148 A * 4/2005 ............. G01R 31/40

*Primary Examiner* — Gustavo A Rosario-Benitez
(74) *Attorney, Agent, or Firm* — Perkins Coie LLP

(57) ABSTRACT

A DCR current sensing circuit used in a switching converter having a power switch and an inductor. The DCR current sensing circuit has a current sensing capacitor coupled in series with a current sensing resistor to form a RC circuit, a current mirror, a first and a second compensation circuits, wherein the RC circuit is coupled in parallel with the inductor. The current mirror generates a first mirror current signal and a second mirror current signal based on a voltage across the current sensing capacitor. The first compensation circuit receives the first mirror current signal and generates a first current sensing signal for meeting a first requirement of the switching converter. The second compensation circuit receives the second mirror current signal and generates a second current sensing signal for meeting a second requirement of the switching converter.

12 Claims, 11 Drawing Sheets

(56) References Cited

U.S. PATENT DOCUMENTS

| | | | | |
|---|---|---|---|---|
| 2012/0194161 | A1* | 8/2012 | Latham, II | H02M 3/156 323/286 |
| 2014/0002047 | A1* | 1/2014 | Houston | H02M 3/156 323/283 |
| 2015/0222171 | A1* | 8/2015 | Nguyen | H02M 1/08 323/282 |
| 2016/0013719 | A1* | 1/2016 | Babazadeh | H02M 3/157 323/271 |
| 2017/0025947 | A1* | 1/2017 | Wang | H02M 3/158 |
| 2017/0331371 | A1* | 11/2017 | Parto | G06F 1/26 |
| 2019/0386561 | A1* | 12/2019 | King | H02M 1/42 |
| 2022/0271664 | A1* | 8/2022 | Jaladanki | H02M 1/0009 |

* cited by examiner

ADAPTIVE INDUCTOR DCR CURRENT SENSING CIRCUIT IN A SWITCHING CONVERTER AND ASSOCIATED METHOD

CROSS-REFERENCE TO RELATED APPLICATIONS

This application claims the benefit of CN application No. 202110266737.8, filed on Mar. 11, 2021, and incorporated herein by reference.

TECHNICAL FIELD

The present invention generally relates to electronic circuits, and more particularly but not exclusively, to inductor direct current resistance (DCR) current sensing circuits and associated current sensing methods.

BACKGROUND

DCR current sensing is widely used in switching converters. FIG. 1 illustrates a traditional DCR current sensing circuit 50. As shown in FIG. 1, the DCR current sensing circuit 50 comprises a current sensing resistor $R_S$ and a current sensing capacitor $C_S$. The current sensing resistor $R_S$ and the current sensing capacitor $C_S$ are coupled in series to form a RC circuit and the RC circuit is coupled to an inductor L in parallel, wherein the DC resistance of the inductor L is shown as an equivalent resistor $R_L$. When the time constant of $R_S$ and $C_S$ is exactly matched with the time constant of the inductor L, i.e., $C_S \times R_S = L/R_L$, a voltage Vsense across the current sensing capacitor $C_S$ is equal to $IL \times R_L$. In other words, the current signal IL flowing through the inductor L can be sensed by measuring the voltage Vsense.

However, in practical applications, different device manufacturers or device sizes have nonlinearity errors. For example, there may be up to ±20% error in inductors of same type. Thus it is usually difficult to make the aforementioned two time constants exactly match. Once there is a mismatch between the two time constants of DCR current sensing circuit, the system will be overdamped or underdamped. In practical applications, repeated adjustments are required to mitigate the nonlinear error or mismatch. For example, in the switching converter shown in FIG. 1, a compensation resistor Rg is coupled across the current sensing capacitor $C_S$, and the resistance of Rg is adjusted repeatedly to regulate the mismatch. In addition, there are strict specifications in some CPU applications having multi-phase switching circuits, it will take more time and increase the difficulty to adjust the time constants of the DCR current sensing circuit in per-phase circuit. Therefore, it is desired to provide an improved DCR current sensing circuit and method that can overcome these challenges.

SUMMARY

An embodiment of the present invention discloses a DCR current sensing circuit used in a switching converter, wherein the switching converter has a power switch and an inductor, and converts an input voltage into an output voltage, the DCR current sensing circuit comprising: a current sensing capacitor, a current mirror, a first compensation circuit and a second compensation circuit. Wherein the current sensing capacitor is coupled in series with a current sensing resistor to form a RC circuit and the RC circuit is coupled in parallel with the inductor. The current mirror has an input terminal, a first output terminal and a second output terminal, wherein the input terminal is configured to receive a voltage sensing signal indicative of a voltage across the current sensing capacitor, based on the voltage sensing signal, the current mirror generates a first mirror current signal at the first output terminal and a second mirror current signal at the second output terminal. The first compensation circuit is coupled to the first output terminal of the current mirror to receive the first mirror current signal and configured to generate a first current sensing signal for meeting a first requirement of the switching converter. The second compensation circuit is coupled to the second output terminal of the current mirror to receive the second mirror current signal and configure to generate a second current sensing signal for meeting a second requirement of the switching converter.

An embodiment of the present invention discloses a controller used in a switching converter, wherein the switching converter has a power switch and an inductor, and converts an input voltage into an output voltage, the controller comprising: a current sensing capacitor, a current mirror, a first compensation circuit, a second compensation circuit and a system controller. Wherein the current sensing capacitor is coupled in series with a current sensing resistor to form a RC circuit and the RC circuit is coupled in parallel with the inductor. The current mirror has an input terminal, a first output terminal and a second output terminal, wherein the input terminal is configured to receive a voltage sensing signal indicative of a voltage across the current sensing capacitor, based on the voltage sensing signal, the current mirror generates a first mirror current signal at the first output terminal and a second mirror current signal at the second output terminal. The first compensation circuit is coupled to the first output terminal of the current mirror to receive the first mirror current signal and configured to generate a first current sensing signal for meeting a first requirement of the switching converter. The second compensation circuit is coupled to the second output terminal of the current mirror to receive the second mirror current signal and configure to generate a second current sensing signal for meeting a second requirement of the switching converter. The system controller is configured to provide a current reporting signal to a microprocessor unit based on the first current sensing signal, the microprocessor unit is configured to provide a regulation instruction based on the current reporting signal, and wherein the system controller is configured to generate a switch control signal to control the power switch based on the regulation instruction, the second current sensing signal and a feedback voltage signal indicative of the output voltage.

An embodiment of the present invention discloses a DCR current sensing method used in a switching converter, wherein the switching converter has a power switch, an inductor, and a current sensing capacitor coupled in series with a current sensing resistor to form a RC circuit and wherein the RC circuit is coupled in parallel with the inductor, the DCR current sensing method comprising: 1) converting a voltage across the current sensing capacitor into a first mirror current signal and a second mirror current signal; 2) generating a first current sensing signal for meeting a first requirement of the switching converter based on the first mirror current signal; and 3) generating a second current sensing signal for meeting a second requirement of the switching converter based on the second mirror current signal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
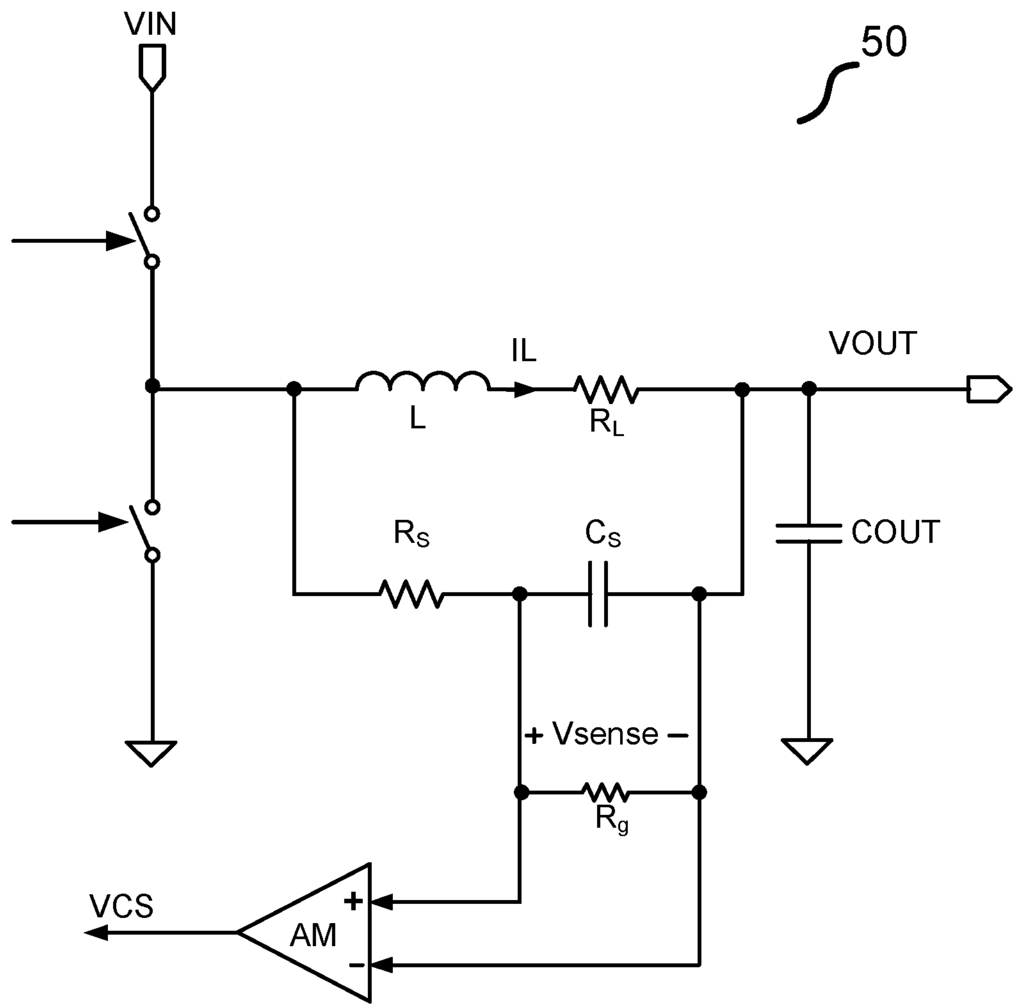
FIG. 1 illustrates a traditional DCR current sensing circuit 50.
Figure 2:
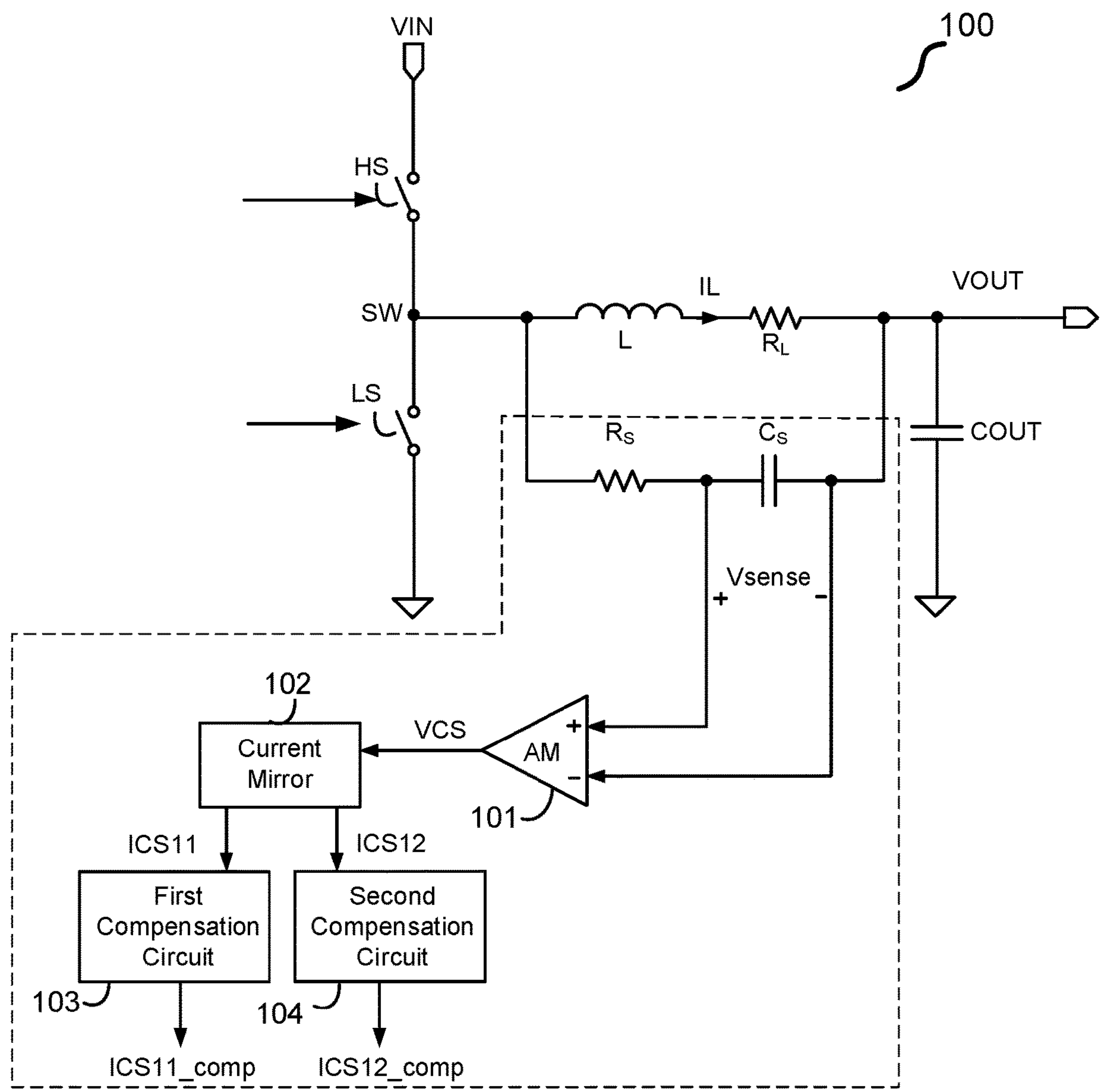
FIG. 2 illustrates a switching converter 100 with DCR current sensing circuit in accordance with an embodiment of the present invention.

FIG. 2 illustrates a switching converter 100 with DCR current sensing circuit in accordance with an embodiment of the present invention. As shown in FIG. 2, the switching converter 100 comprises a switching circuit. The switching circuit has at least one power switch and converts an input voltage VIN into an output voltage VOUT via turning ON and OFF of the at least one power switch. In the example shown in FIG. 2, the switching circuit 100 comprises a Buck circuit that comprises a high side switch HS, a low side switch LS, an inductor L and a capacitor COUT, wherein the high side switch HS and the low side switch LS are both power switches. In another embodiment, the low side switch LS can be replaced by a diode. Those skilled in the art can understand that, the switching circuit 100 can be configured in any suitable DC/DC or AC/DC topologies, such as synchronous or asynchronous Buck, Boost, Forward or Flyback converters. The power switches of the switching circuit 10 can be any controllable semiconductor device, such as MOSFET, IGBT, and so on.

As shown in FIG. 2, the switching converter 100 further comprises a DCR current sensing circuit. The DCR current sensing circuit comprises a current sensing resistor $R_S$, a current sensing capacitor $C_S$, an operational amplifier 101, a current mirror 102, a first compensation circuit 103 and a second compensation circuit 104. Wherein the current sensing resistor $R_S$ is coupled in series with a current sensing capacitor $C_S$ to form a RC circuit having a first time constant, and the RC circuit is coupled in parallel with the inductor L. $R_L$ represents the DC resistance of the inductor L. The inductor L and the DC resistance $R_L$ have a second time constant. The operational amplifier 101 has a first input terminal, a second input terminal and an output terminal, wherein the first and the second input terminals are coupled across the current sensing capacitor $C_S$. The operational amplifier 101 is configured to amplify a voltage across the current sensing capacitor $C_S$ and generate a voltage sensing signal VCS, wherein the voltage sensing signal VCS represents a current signal IL flowing through the inductor L. The current mirror 102 has an input terminal, a first output terminal, and a second output terminal, wherein the input terminal is configured to receive the voltage sensing signal VCS. The current mirror 102 is configured to convert the voltage sensing signal VCS into a first mirror current signal ICS11 at the first output terminal and a second mirror current signal ICS12 at the second output terminal. In one embodiment, the first mirror current signal ICS11 is equal to the second mirror current signal ICS12. In another embodiment, the first mirror current signal ICS11 is proportional to the second mirror current signal ICS12. In one embodiment, both the first mirror current signal ICS11 and the second mirror current signal ICS12 can represent the current signal IL flowing through the inductor L.

The first compensation circuit 103 is configured to receive the first mirror current signal ICS11 and generate a first current sensing signal ICS11_comp to compensate the first time constant. The second compensation circuit 104 is configured to receive the second mirror current signal ICS12 and generate a second current sensing signal ICS12_comp to compensate the first time constant. In one embodiment, the first time constant is compensated by the first compensation circuit 103 based on a first requirement of the switching converter 100. In another embodiment, the first time constant is compensated by the second compensation circuit 104 based on a second requirement of the switching converter 100. In the example shown in FIG. 2, the operational amplifier 101, the current mirror 102, the first compensation circuit 103 and the second compensation circuit 104 can be fabricated in an integrated circuit (IC), the inductor L, the current sensing resistor $R_S$ and the current sensing capacitor $C_S$ are coupled outside the IC. The high side switch HS and the low side switch LS can be integrated inside or outside the IC.

In one embodiment, there is a mismatch between the first time constant and the second time constant, the mismatch causes an instantaneous current sensed to be higher or lower than an actual current and the switching converter 100 will be overdamped or underdamped. The overdamping and underdamping of the switching converter 100 will result in different performances. If it is overdamped, the stability is good, but the transient performance is poor. If it is underdamped, the transient performance is good, but the stability is poor, ringing and other unstable phenomena may occur. In some applications, the mismatch between the first time constant and the second time constant may be desired to obtain expected transient performance, stability or trade-off between the transient performance and stability. For example, the first compensation circuit 103 and/or the second compensation circuit 104 can be used to generate the first current sensing signal ICS11_comp and/or the second current sensing signal ICS12_comp to compensate the first time constant for meeting different performance requirements of the switching converter 100. The first current sensing signal ICS11_comp provided by the first compensation circuit 103 and/or the second current sensing signal ICS12_comp provided by the second compensation circuit 104 can be higher or lower than the actual inductor current, and can be used to shape the response of the switching converter 100 to meet the first requirement and/or the second requirement. In one embodiment, the first requirement and/or the second requirement of the switching converter 100 can be met by underdamping or overdamping the response. Those skilled in the art can understand that, "to compensate the first time constant" refers to obtain an expected mismatch between the first time constant and the second time constant, to make the switching converter 100 overdamped or underdamped for meeting the first requirement or the second requirement.

In one embodiment, the first requirement of the switching converter 100 comprises transient performance requirement. The second requirement of the switching converter 100 comprises stability requirement. In one embodiment, only expected transient performance of switching converter 100 is required, i.e., to meet the first requirement, the first compensation circuit 103 is used to generate the first current sensing signal ICS11_comp to compensate the first time constant. The first current sensing signal ICS11_comp is further used to make the switching converter 100 underdamped to improve the transient performance. In another embodiment, only expected stability of switching converter 100 is required, i.e., to meet the second requirement, the second compensation circuit 104 is used to generate the second current sensing signal ICS12_comp to compensate the first time constant. The second current sensing signal ICS12_comp is further used to make the switching converter 100 overdamped to improve the stability. In yet another embodiment, both expected transient performance and stability of switching converter 100 are required, the first compensation circuit 103 and the second compensation circuit 104 are both used to obtain a trade-off performance. In a further embodiment, the first compensation circuit 103 and the second compensation circuit 104 can compensate the first time constant alternatively and repeatedly until expected trade-off between the transient performance and stability requirement of switching converter 100 is obtained.

In prior art, only a single current sensing signal is used to adjust the transient performance and stability, so it is difficult to simultaneously balance and meet the requirements of the transient performance and stability. The adjustment may be repeated too many times and thus low efficiency. Compared to the prior art, in the example shown in FIG. 2, the signal current sensing signal is converted into the first mirror current signal ICS11 and the second mirror current signal ICS12, and the first mirror current signal ICS11 and the second mirror current signal ICS12 are further used to adjust the transient performance and stability requirements respectively, which can improve the adjustment efficiency.

Figure 3:
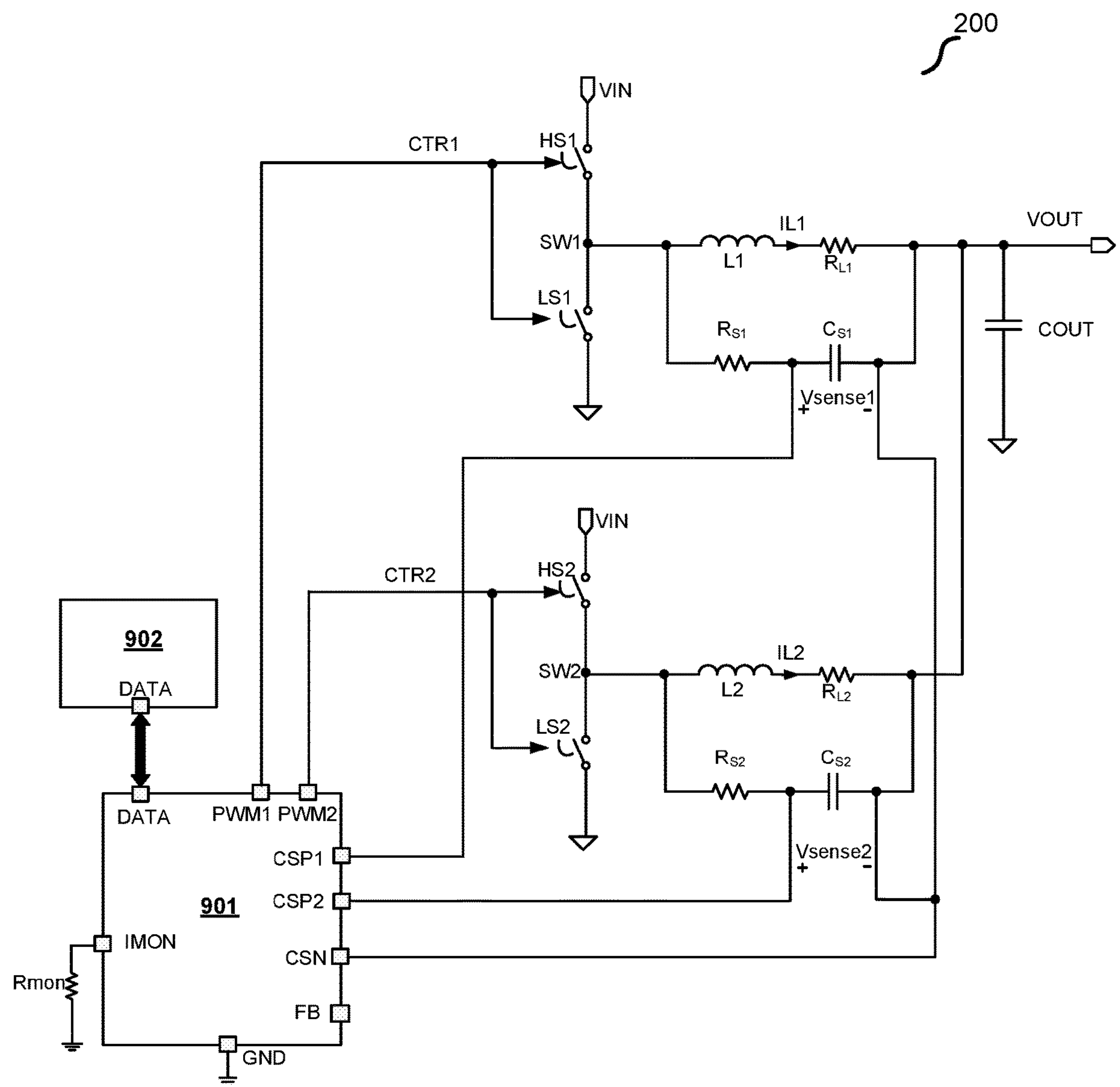
FIG. 3 illustrates a switching converter 200 with DCR current sensing circuit in accordance with another embodiment of the present invention.

FIG. 3 illustrates a switching converter 200 with DCR current sensing circuit in accordance with another embodiment of the present invention. The switching converter 200 takes a dual-phase switching circuit and Buck topology as an example for illustration, other suitable circuit structures are also applicable here.

In the example shown in FIG. 3, the switching converter 200 comprises a first switching circuit, a second switching circuit, a first DCR current sensing circuit and a second DCR current sensing circuit. The first DCR current sensing circuit comprises a current sensing resistor $R_{S1}$ and a current sensing capacitor $C_{S1}$, wherein $R_{S1}$ is coupled in series with $C_{S1}$ to form a RC circuit, and the RC circuit is coupled in parallel with an inductor L1, $R_{L1}$ represents the DC resistance of the inductor L1. A voltage across the current sensing capacitor $C_{S1}$ is labeled as Vsense1. Similarly, the second DCR current sensing circuit comprises a current sensing resistor $R_{S2}$ and a current sensing capacitor $C_{S2}$, wherein $R_{S2}$ is coupled in series with $C_{S2}$ to form a RC circuit and the RC circuit is coupled in parallel with an inductor L2, $R_{L2}$ represents the DC resistance of the inductor L2. A voltage across the current sensing capacitor $C_{S2}$ is labeled as Vsense2.

As shown in FIG. 3, the switching converter 200 further comprises a power management circuit 901 and a microprocessor unit 902. The power management circuit 901 comprises a first current sensing pin CSP1, a second current sensing pin CSP2, a current sensing reference pin CSN, a current monitoring pin IMON, a data transmission pin DATA, a first control pin PWM1, a second control pin PWM2, an output voltage feedback pin FB and a ground pin GND. The first current sensing pin CSP1 is coupled to a first terminal of the current sensing capacitor $C_{S1}$, the second current sensing pin CSP2 is coupled to a first terminal of the current sensing capacitor $C_{S2}$, and the current sensing reference pin CSN is coupled to a second terminal of $C_{S1}$ and a second terminal of $C_{S2}$. The power management circuit 901 is configured to sense a first current signal IL1 flowing through the inductor L1 and a second current signal IL2 flowing through the inductor L2 by the first current sensing pin CSP1, the second current sensing pin CSP2 and the current sensing reference pin CSN. The current monitoring pin IMON is coupled to a reference ground through a resistor Rmon, and is configured to provide an average current signal indicative of the average current of the first current signal IL1 and the second current signal IL2. The data transmission pin DATA is coupled to a data transmission pin DATA of the microprocessor unit 902 so that the power management circuit 901 and the microprocessor unit 902 can communicate with each other. Those skilled in the art can understand that the data transmission pin DATA can be more than one pin. For example, in the I2C transmission protocol, the data transmission pin DATA comprises a clock pin SCL and a data pin SDA. The first control pin PWM1 and the second control pin PWM2 are configured to provide a first control signal CTRL1 and a second control signal CTRL2 to control the power switches in the first and the second switching circuits respectively. The output voltage feedback pin FB is configured to receive a feedback voltage signal indicative of the output voltage VOUT. The ground pin GND is coupled to the reference ground.

Figure 4:
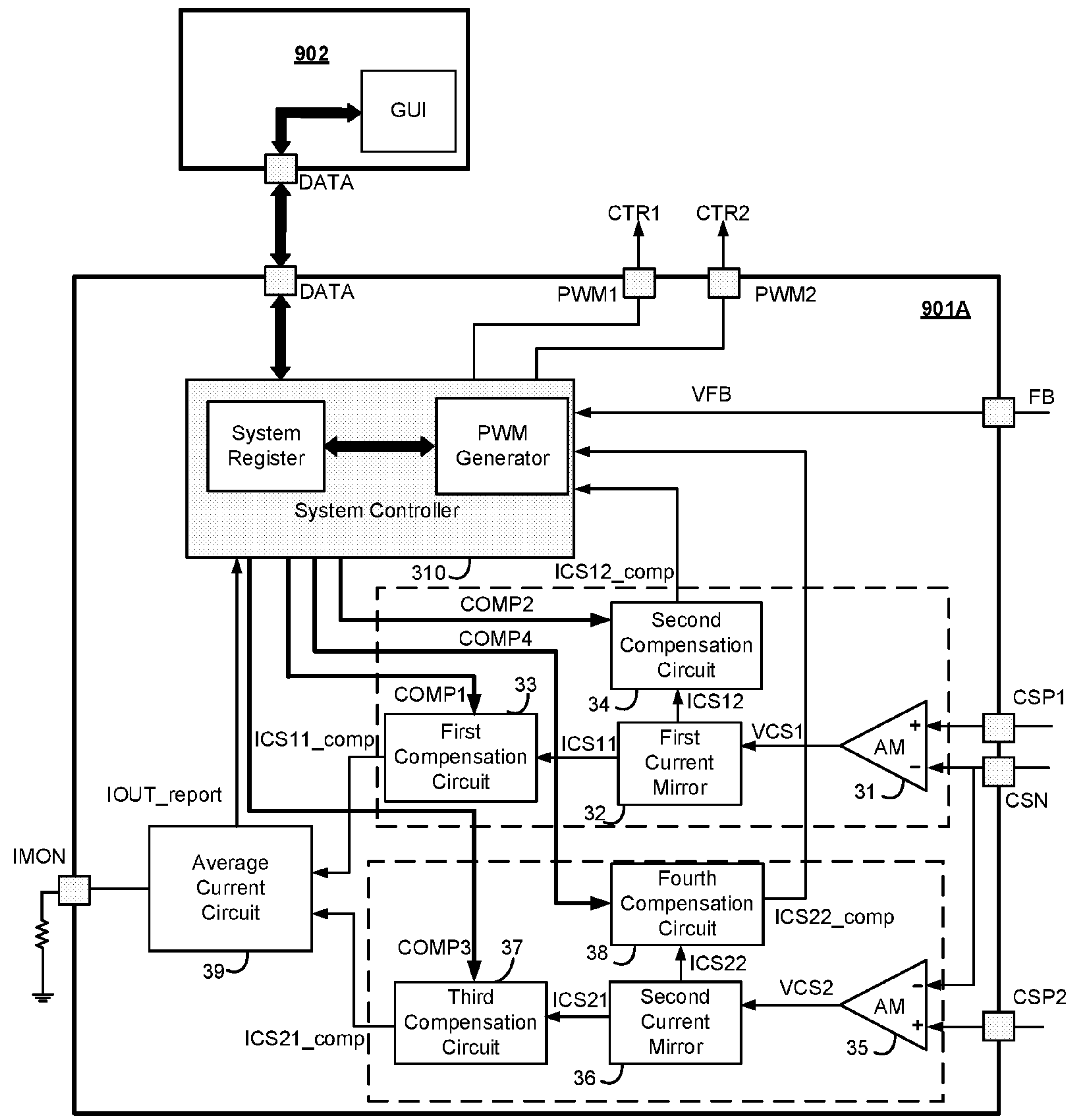
FIG. 4 illustrates a power management circuit 901A and a microprocessor unit 902 in accordance with an embodiment of the present invention.

FIG. 4 illustrates a power management circuit 901A and a microprocessor unit 902 in accordance with an embodiment of the present invention. Next, the working principle of the DCR current sensing circuit in the switching converter 200 will be set forth based on the examples shown in FIG. 3 and FIG. 4.

In the example shown in FIG. 4, except for the current sensing resistors $R_{S1}$, $R_{S2}$ and the current sensing capacitors $C_{S1}$, $C_{S2}$, other elements of the first and the second DCR current sensing circuits are integrated inside the power management circuit 901A.

In the power management circuit 901A, the first DCR current sensing circuit comprises a first operational amplifier 31, a first current mirror 32, a first compensation circuit 33 and a second compensation circuit 34. The first operational amplifier 31 has a first input terminal, a second input terminal and an output terminal, wherein the first input terminal is coupled to the first current sensing pin CSP1 and the second input terminal is coupled to the current sensing reference pin CSN. The first operational amplifier 31 is configured to amplify a voltage across the current sensing capacitor $C_{S1}$ and generate a first voltage sensing signal VCS1, wherein the first voltage sensing signal VCS1 represents the first current signal IL1 flowing through the inductor L1. The first current mirror 32 is configured to receive the first voltage sensing signal VCS1, and generate a first mirror current signal ICS11 and a second mirror current signal ICS12 based on the first voltage sensing signal VCS1. The first compensation circuit 33 is configured to receive a first compensation control signal COMP1 and the first mirror current signal ICS11, and generate a first current sensing signal ICS11_comp based thereupon. In one embodiment, the first compensation circuit 33 is configured to regulate the first mirror current signal ICS11 based on the system transient performance requirement. The second compensation circuit 34 is configured to receive a second compensation control signal COMP2 and the second mirror current signal ICS12, and generate a second current sensing signal ICS12_comp based thereupon. In one embodiment, the second compensation circuit 34 is configured to regulate the second mirror current signal ICS12 based on the system stability requirement.

Similarly, the second DCR current sensing circuit comprises a second operational amplifier 35, a second current mirror 36, a third compensation circuit 37 and a fourth compensation circuit 38. The second operational amplifier 35 has a first input terminal, a second input terminal and an output terminal, wherein the first input terminal is coupled to the second current sensing pin CSP2 and the second input terminal is coupled to the current sensing reference pin CSN. The second operational amplifier 35 is configured to amplify a voltage across the current sensing capacitor $C_{S2}$ and generate a second voltage sensing signal VCS2, wherein the second voltage sensing signal VCS2 represents the second current signal IL2 flowing through the inductor L2. The second current mirror 36 is configured to receive the second voltage sensing signal VCS2, and generate a third mirror current signal ICS21 and a fourth mirror current signal ICS22 based on the second voltage sensing signal VCS2. The third compensation circuit 37 is configured to receive a third compensation control signal COMP3 and the third mirror current signal ICS21, and generate a third current sensing signal ICS21_comp based thereupon. In one embodiment, the third compensation circuit 37 is configured to regulate the third mirror current signal ICS21 based on the system transient performance requirement. The fourth compensation circuit 38 is configured to receive a fourth compensation control signal COMP4 and the fourth mirror current signal ICS22, and generate a fourth current sensing signal ICS22_comp based thereupon. In one embodiment, the fourth compensation circuit 38 is configured to regulate the fourth mirror current signal ICS22 based on the system stability requirement.

The power management circuit 901A further comprises an average current circuit 39. The average current circuit 39 has a first terminal, a second terminal, a third terminal and a fourth terminal, wherein the first terminal is configured to receive the first current sensing signal ICS11_comp, the second terminal is configured to receive the third current sensing signal ICS21_comp, and the third terminal is coupled to the current monitoring pin IMON. The average current circuit 39 is configured to provide an average current signal indicative of the average current of the first current sensing signal ICS11_comp and the third current sensing signal ICS21_comp at the third terminal. In one embodiment, the average current signal is a voltage signal. The average current circuit 39 further provides a current reporting signal IOUT_report at the fourth terminal. In one embodiment, the current reporting signal IOUT_report comprises the average current signal. In another embodiment, the current reporting signal IOUT_report further comprises a first error current signal indicative of the difference between the first current sensing signal ICS11_comp and the average current signal, and a second error current signal indicative of the difference between the third current sensing signal ICS21_comp and the average current signal.

The power management circuit 901A further comprises a system controller 310. The system controller 310 is configured to receive a feedback voltage signal VFB indicative of the output voltage VOUT, the second current sensing signal ICS12_comp, the fourth current sensing signal ICS22_comp, and the current reporting signal IOUT_report. In one embodiment, the system controller 310 is configured to provide the current reporting signal IOUT_report to the microprocessor unit 902 through the data transmission pin DATA of the power management circuit 901A. Then the microprocessor unit 902 is configured to receive the current reporting signal IOUT_report through its data transmission pin DATA and provide a regulation instruction to the power management circuit 901A based on the received information. The power management circuit 901A is configured to provide the first control signal CTRL1 and the second control signal CTRL2 based on the received regulation instruction.

In one embodiment, the system controller 310 comprises a system register and a PWM generator. The current reporting signal IOUT_report can be provided to the data transmission pin DATA directly through the system register and further sent to the microprocessor unit 902, thus the microprocessor unit 902 can receive the current information quickly and provide the regulation instruction to the system controller 310 in time. In one embodiment, the current reporting signal IOUT_report comprises the average current signal. When the average current signal changes due to load transient, the microprocessor unit 902 can receive the average current signal quickly and provide the regulation instruction to the power management circuit 901A. Then a working frequency or a current threshold of the switching converter 200 can be adjusted to adapt the load transient. In another embodiment, the current reporting signal IOUT_report further comprises the first error current signal and the second error current signal. When there is uneven current between the dual-phase switching circuits, the microprocessor unit 902 can quickly determine the current in per-phase switching circuit based on the received current information, and provide the regulation instruction to the power management circuit 901A. For example, when the current in the first switching circuit increases, based on the regulation instruction provided by the microprocessor unit 902, the system controller 310 will conduct phase shielding or reduce a current reference in a control loop, to reduce the current in the first switching circuit quickly.

In the example shown in FIG. 4, on one hand, the switching converter 200 can be regulated quickly by the system controller 310 based on the first current sensing signal ICS11_comp and the third current sensing signal ICS21_comp, which effect the transient performance. On the other hand, the second current sensing signal ICS12_comp and the fourth current sensing signal ICS22_comp are directly involved in the control loop of the PWM generator, which have impact on the system stability.

As shown in FIG. 4, the system controller 310 also provides compensation control signals COMP1~COMP4 to the four compensation circuits for regulating the four mirror current signals respectively. In one embodiment, the microprocessor unit 902 is configured to provide a compensation instruction to the system controller 310 through the data transmission pin DATA, and the system controller 310 is configured to generate the compensation control signals COMP1~COMP4 based on the compensation instruction. In one embodiment, the microprocessor unit 902 comprises a visual graphical user interface (GUI). Users can manually input different compensation instructions into the GUI to regulate the compensation control signals COMP1~COMP4. In addition, users can also select working waveforms of the switching converter 200 to be shown on the GUI. In one embodiment, the first current sensing signal ICS11_comp and the third current sensing signal ICS21_comp is selected and shown on the GUI, then different compensation instructions are input to regulate the first current sensing signal ICS11_comp and the third current sensing signal ICS21_comp. When the working waveforms of the first current sensing signal ICS11_comp and the third current sensing signal ICS21_comp shown on the GUI indicate that transient performance requirement are met, the compensation instructions won't be changed any more. Similarly, the second current sensing signal ICS12_comp and the fourth current sensing signal ICS22_comp are regulated to meet the stability requirement.

The system controller 310 further comprises multiple Analog-to-Digital Converters and multiple Digital-to-Analog Converters (both not shown) used for signal converting. In one embodiment, the average current circuit 39 can also be configured inside the system controller 310.

Figure 5:
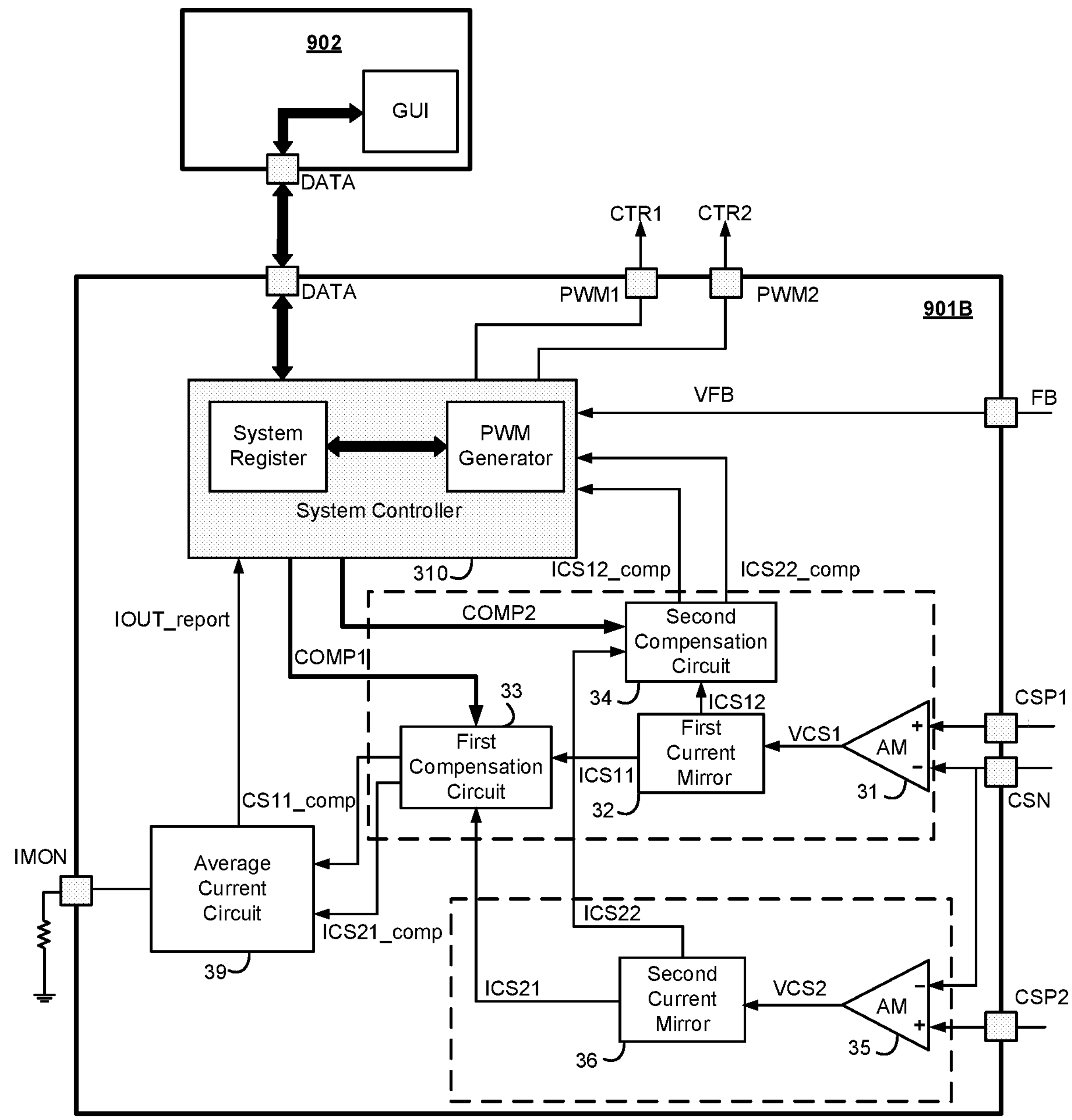
FIG. 5 illustrates a power management circuit 901B and a microprocessor unit 902 in accordance with another embodiment of the present invention.

FIG. 5 illustrates a power management circuit 901B and a microprocessor unit 902 in accordance with another embodiment of the present invention. The first and the third compensation circuits in FIG. 4 share a single compensation circuit, i.e., a first compensation circuit 33 in FIG. 5, and the second and the fourth compensation circuits in FIG. 4 share another compensation circuit, i.e., a second compensation circuit 34 in FIG. 5. The first mirror current signal ICS11 and the third mirror current signal ICS21 are fed into the first compensation circuit 33, and can be time-division regulated by the first compensation circuit 33. The second mirror current signal ICS12 and the fourth mirror current signal ICS22 are fed into the second compensation circuit 34 and can be time-division regulated by the second compensation circuit 34. In one embodiment, the first compensation circuit 33 is configured to regulate the first mirror current signal ICS11 and generate the first current sensing signal ICS11_comp. In the meantime, the third current sensing signal ICS21_comp is equal to the third mirror current signal ICS21 since there is no regulation performed on the third mirror current signal ICS21. Then the first compensation circuit 33 is configured to regulate the third mirror current signal ICS21 and generate the third current sensing signal ICS21_comp. At this moment, no regulation is performed on the first mirror current signal ICS11 and thus the first current sensing signal ICS11_comp is equal to the first mirror current signal ICS11. Similarly, the second compensation circuit 34 is configured to regulate the second mirror current signal ICS12 and the fourth mirror current signal ICS22 in the same way. Those skilled in the art can understand that the dual-phase switching circuits is an exemplary illustration, the above method about sharing circuit, i.e., a single compensation circuit is shared for stability adjustment, and another compensation circuit is shared for transient performance adjustment, can also be used in multi-phase switching circuits.

Figure 6:
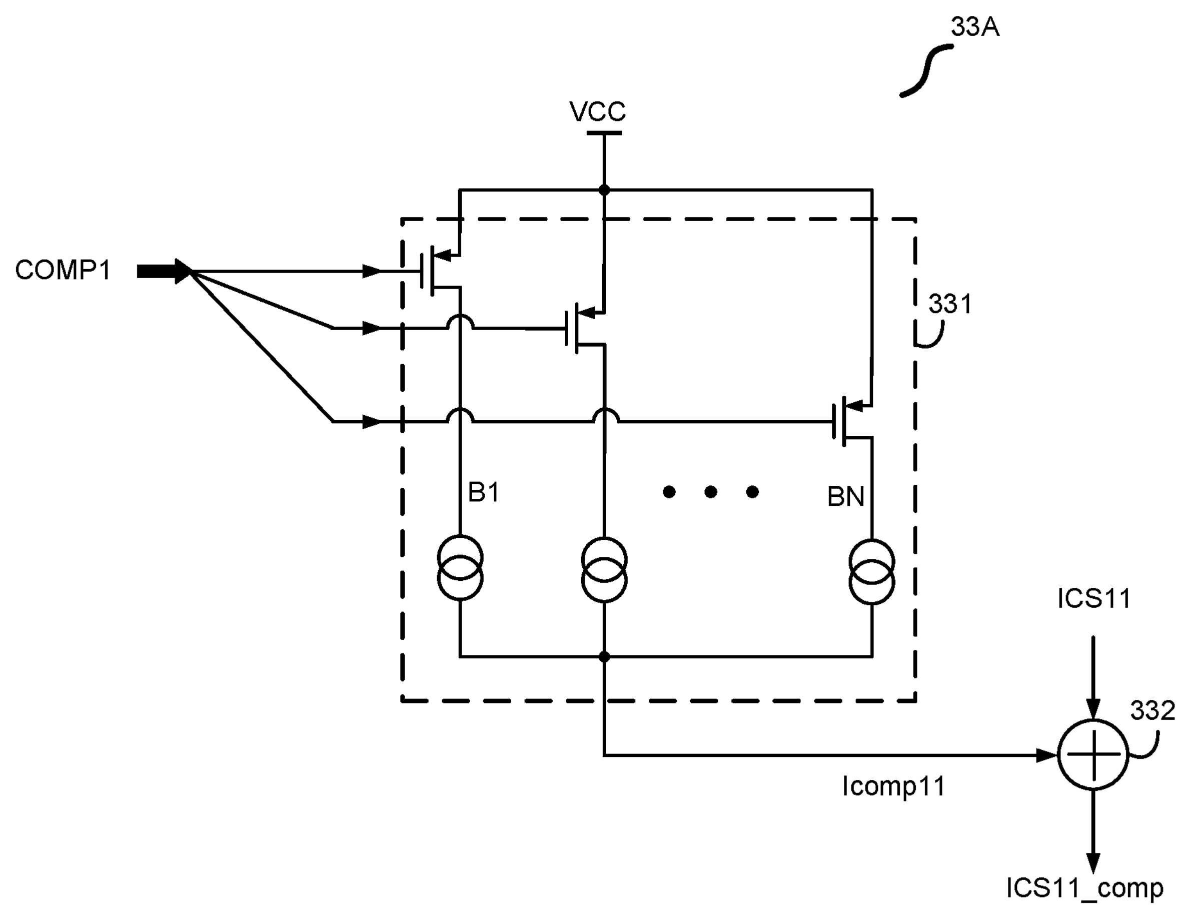
FIG. 6 illustrates a first compensation circuit 33A in accordance with an embodiment of the present invention.

FIG. 6 illustrates a first compensation circuit 33A in accordance with an embodiment of the present invention. The first compensation circuit 33A comprises a controlled current source 331. As shown in FIG. 6, the controlled current source 331 has a first terminal coupled to a power supply and a second terminal configured to provide a first compensation current signal Icomp11. The controlled current source 331 comprises a plurality of branches B1~BN coupled in parallel, wherein N represents an integer greater than or equal to 1. Each of plurality of branches Bi (i=1, 2, . . . , N) comprises an associated current source and an associated compensation switch coupled in series. In one embodiment, the first compensation control signal COMP1 comprises N compensation switch control signals and each compensation switch control signal is provided to a corresponding compensation switch. The first compensation current signal Icomp11 is adjusted via turning ON and OFF of each compensation switch based on the corresponding compensation switch control signal. In one embodiment, the compensation switch control signal comprises logic high/low signal, wherein when the compensation switch control signal is in logic high, the corresponding compensation switch is turned ON; when the compensation switch control signal is in logic low, the corresponding compensation switch is turned OFF. The first compensation circuit 33A further comprises an adder (or subtracter) 332. The adder 332 has a first terminal, a second terminal and a third terminal, wherein the first terminal is configured to receive the first compensation current signal Icomp11, and the second terminal is configured to receive the first mirror current signal ICS11. The adder 332 is configured to provide the first current sensing signal ICS11_comp at the third terminal based thereupon. In one embodiment, the logic high/low of the compensation switch control signals are determined based on the compensation instruction from the GUI.

The working principles of the second compensation circuit 34, the third compensation circuit 37 and the fourth compensation circuit 38 shown in FIG. 4 are similar with the first compensation circuit 33A shown in FIG. 6, as long as the compensation circuits receive corresponding compensation control signals and mirror current signals.

Figure 7:
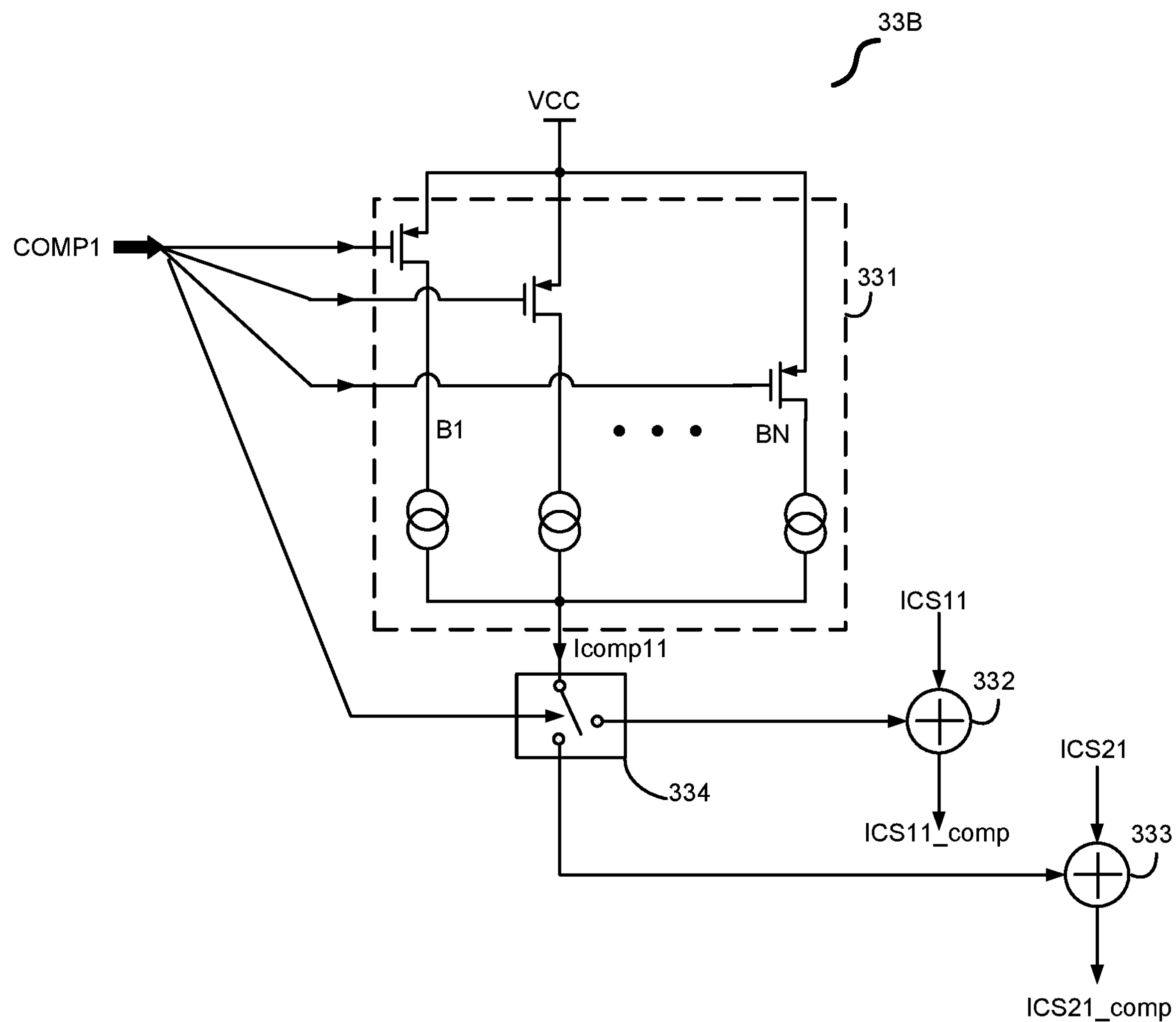
FIG. 7 illustrates a first compensation circuit 33B in accordance with another embodiment of the present invention.

FIG. 7 illustrates a first compensation circuit 33B in accordance with another embodiment of the present invention. Compared with the first compensation circuit 33A shown in FIG. 6, the first compensation circuit 33B shown in FIG. 7 further comprises an adder 333 and a multiplex selector 334. The multiplex selector 334 has a first terminal, a second terminal, a third terminal and a control terminal, wherein the first terminal is configured to receive the first compensation current signal Icomp11, the second terminal is coupled to the adder 332, the third terminal is coupled to the adder 333, and the control terminal is configured to receive a multiplex selecting signal. In one embodiment, the first compensation control signal COMP1 comprises the multiplex selecting signal, which is used to control the first compensation current signal Icomp11 to be fed into one of the two adders. For example, when the multiplex selecting signal controls the first terminal and the second terminal of the multiplex selector 334 coupled together, the adder 332 receives the first compensation current signal Icomp11 and the first mirror current signal ICS11, and generates the first current sensing signal ICS11_comp based thereupon; when the multiplex selecting signal controls the first terminal and the third terminal of the multiplex selector 334 coupled together, the adder 333 receives the first compensation current signal Icomp11 and the third mirror current signal ICS21, and generates the third current sensing signal ICS21_comp based thereupon. In one embodiment, the logic high/low of the compensation switch control signals and the multiplex selecting signal are determined based on the compensation instruction from the GUI.

Figure 8:
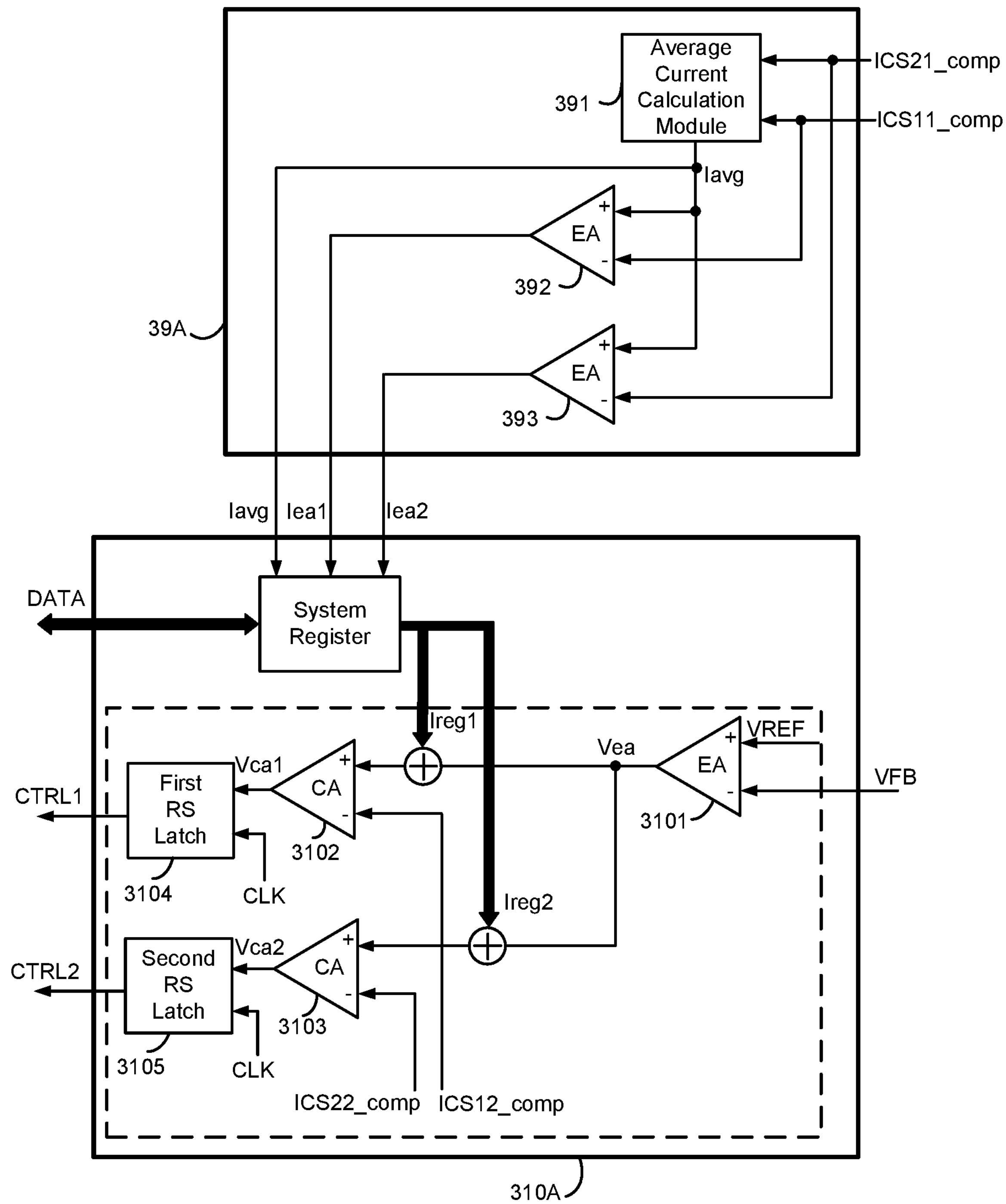
FIG. 8 illustrates an average current circuit 39A and a system controller 310A in accordance with an embodiment of the present invention.

FIG. 8 illustrates an average current circuit 39A and a system controller 310A in accordance with an embodiment of the present invention. The average current circuit 39A comprises an average current calculation module 391, a first current error amplifier 392 and a second current error amplifier 393. The average current calculation module 391 is configured to receive the first current sensing signal ICS11_comp and the third current sensing signal ICS21_comp, and generate an average current signal Iavg based thereupon. The first current error amplifier 392 is configured to receive the first current sensing signal ICS11_comp and the average current signal Iavg, and generate a first error current signal Iea1, wherein the first error current signal Iea1 represents the amplification value of the difference between the first current sensing signal ICS11_comp and the average current signal Iavg. The second current error amplifier 393 is configured to receive the third current sensing signal ICS21_comp and the average current signal Iavg, and generate a second error current signal Iea2, wherein the second error current signal Iea2 represents the amplification value of the difference between the third current sensing signal ICS21_comp and the average current signal Iavg.

The system controller 310A comprises a PWM generator and a system register. The system register is configured to receive the average current signal Iavg, the first error current signal Iea1 and the second error current signal Iea2, and send the aforementioned current signals to the microprocessor unit 902 through the data transmission pin DATA. The microprocessor unit 902 provides a regulation instruction to adjust the current reference in the current loop of the dual-phase switching circuit based on the received current signals. The system register receives the regulation instruction and sends it to the PWM generator. In the example shown in FIG. 8, the regulation instruction comprises a first current regulation signal Ireg1 and a second current regulation signal Ireg2.

As shown in FIG. 8, the PWM generator comprises a voltage error amplifier 3101, a first current comparator 3102, a second current comparator 3103, a first RS latch 3104 and a second RS latch 3105. The voltage error amplifier 3101 is configured to receive the feedback voltage signal VFB and a reference voltage signal VREF, and generate an error voltage signal Vea based thereupon. The first current comparator 3102 has a first input terminal, a second input terminal and an output terminal, wherein the first input terminal is configured to receive a sum of the error voltage signal Vea and the first current regulation signal Ireg1, and the second input terminal is configured to receive the second current sensing signal ICS12_comp. The first current comparator 3102 is configured to provide a first comparing signal Vca1 at the output terminal based thereupon. The second current comparator 3103 has a first input terminal, a second input terminal and an output terminal, wherein the first input terminal is configured to receive a sum of the error voltage signal Vea and the second current regulation signal Ireg2, and the second input terminal is configured to receive the fourth current sensing signal ICS22_comp. The second current comparator 3103 is configured to provide a second comparing signal Vca2 at the output terminal based thereupon. The first RS latch 3104 is configured to receive the first comparing signal Vca1 and a clock signal CLK, and generate the first control signal CTRL1 based thereupon. The second RS latch 3105 is configured to receive the second comparing signal Vca2 and the clock signal CLK, and generate the second control signal CTRL2 based thereupon.

In the example shown in FIG. 8, on one hand, the reference value of the current sensing signals can be regulated quickly by the first current regulation signal Ireg1 and the second current regulation signal Ireg2, thus the system transient performance is improved. On the other hand, the second current sensing signal ICS12_comp and the fourth current sensing signal ICS22_comp take part in the system closed-loop regulation directly, and have a great impact on the system stability.

Figure 9:
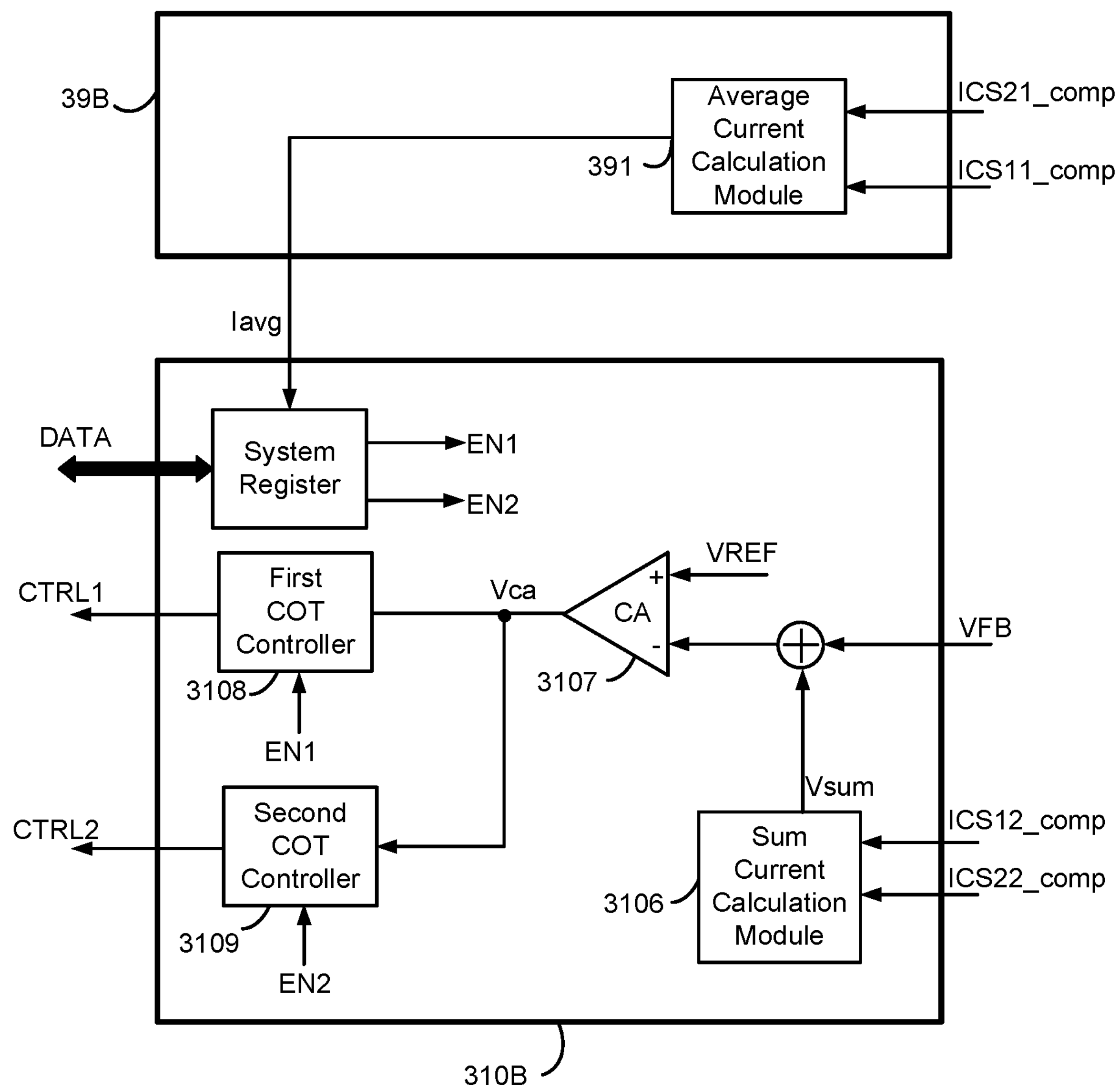
FIG. 9 illustrates an average current circuit 39B and a system controller 310B in accordance with another embodiment of the present invention.

FIG. 9 illustrates an average current circuit 39B and a system controller 310B in accordance with another embodiment of the present invention. The example shown in FIG. 9 is a typical application of CPU power supply. The average current circuit 39B comprises an average current calculation module 391. The average current calculation module 391 is configured to receive the first current sensing signal ICS11_comp and the third current sensing signal ICS21_comp, and generate an average current signal Iavg based thereupon.

The system controller 310B comprises a PWM generator and a system register. The system register is configured to receive the average current signal Iavg and send the average current signal Iavg to the microprocessor unit 902 through the data transmission pin DATA. The microprocessor unit 902 is configured to provide a regulation instruction to control COT controllers in the dual-phase switching circuits based on the average current signal Iavg. The system register is configured to receive the regulation instruction and send it to the PWM generator. In the example shown in FIG. 9, the regulation instruction comprises a first enable signal EN1 and a second enable signal EN2. For example, when the load current is too high, the first enable signal EN1 and the second enable signal EN2 can disable a corresponding COT controller until a new regulation instruction is provided by the microprocessor unit 902.

In the CPU power supply application as shown in FIG. 9, the output voltage VOUT must meet load line specification, i.e., when the load current increases, the output voltage VOUT must decrease. For example, when the load current is 1 A, the output voltage VOUT is 1V; when the load current is 10 A, the output voltage VOUT must decrease to 900 mV. Thus the current sensing signals need to be introduced into voltage loop for regulating the output voltage VOUT. As shown in FIG. 9, the PWM generator comprises a sum current calculation module 3106, a voltage comparator 3107, a first COT controller 3108, and a second COT controller 3109. The sum current calculation module 3106 is configured to receive the second current sensing signal ICS12_comp and the fourth current sensing signal ICS22_comp, and generate a sum voltage signal Vsum. The voltage comparator 3107 has a first input terminal, a second input terminal and an output terminal, wherein the first input terminal is configured to receive a sum of the feedback voltage signal VFB and the sum voltage signal Vsum, and the second input terminal is configured to receive the reference voltage signal VREF. The voltage comparator 3107 is configured to provide a comparing signal Vca at the output terminal based thereupon. The first COT controller 3108 is configured to receive the comparing signal Vca and the first enable signal EN1, and generate the first control signal CTRL1 based thereupon. The second COT controller 3109 is configured to receive the comparing signal Vca and the second enable signal EN2, and generate the second control signal CTRL2 based thereupon.

Those skilled in the art can understand, the peek-current control and constant ON-time control in FIG. 8 and FIG. 9 are only used for illustration, other suitable control methods can be also used here.

Figure 10:
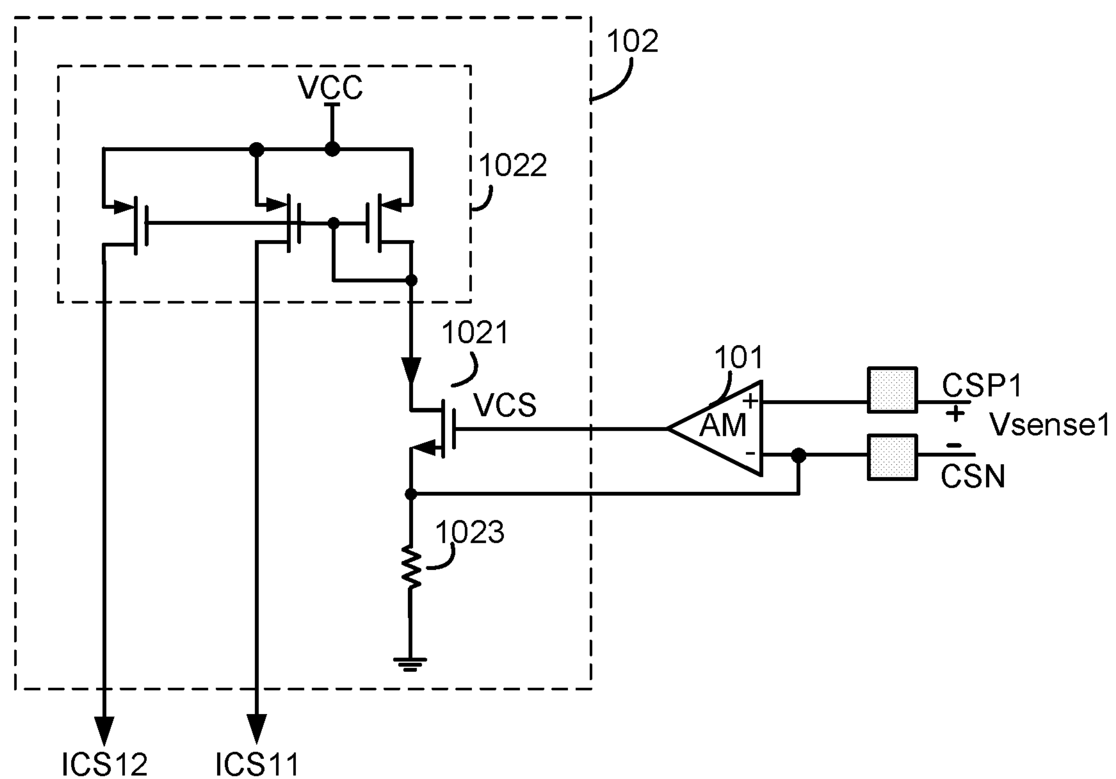
FIG. 10 illustrates a current mirror 102 in accordance with an embodiment of the present invention.

FIG. 10 illustrates a current mirror 102 in accordance with an embodiment of the present invention. The current mirror 102 comprises a transistor 1021, a mirror current source 1022 and a resistor 1023. The transistor 1021 has a drain terminal, a source terminal and a gate terminal, wherein the source terminal is coupled to a first terminal of the resistor 1023 and the second input terminal of the operational amplifier 101, the gate terminal is coupled to the output terminal of the operational amplifier 101 to receive the voltage sensing signal VCS, and the drain terminal is configured to provide a current signal. The mirror current source 1022 is configured to receive the current signal and generate the first mirror current signal ICS11 and the second mirror current signal ICS12 based on the current signal.

Figure 11:
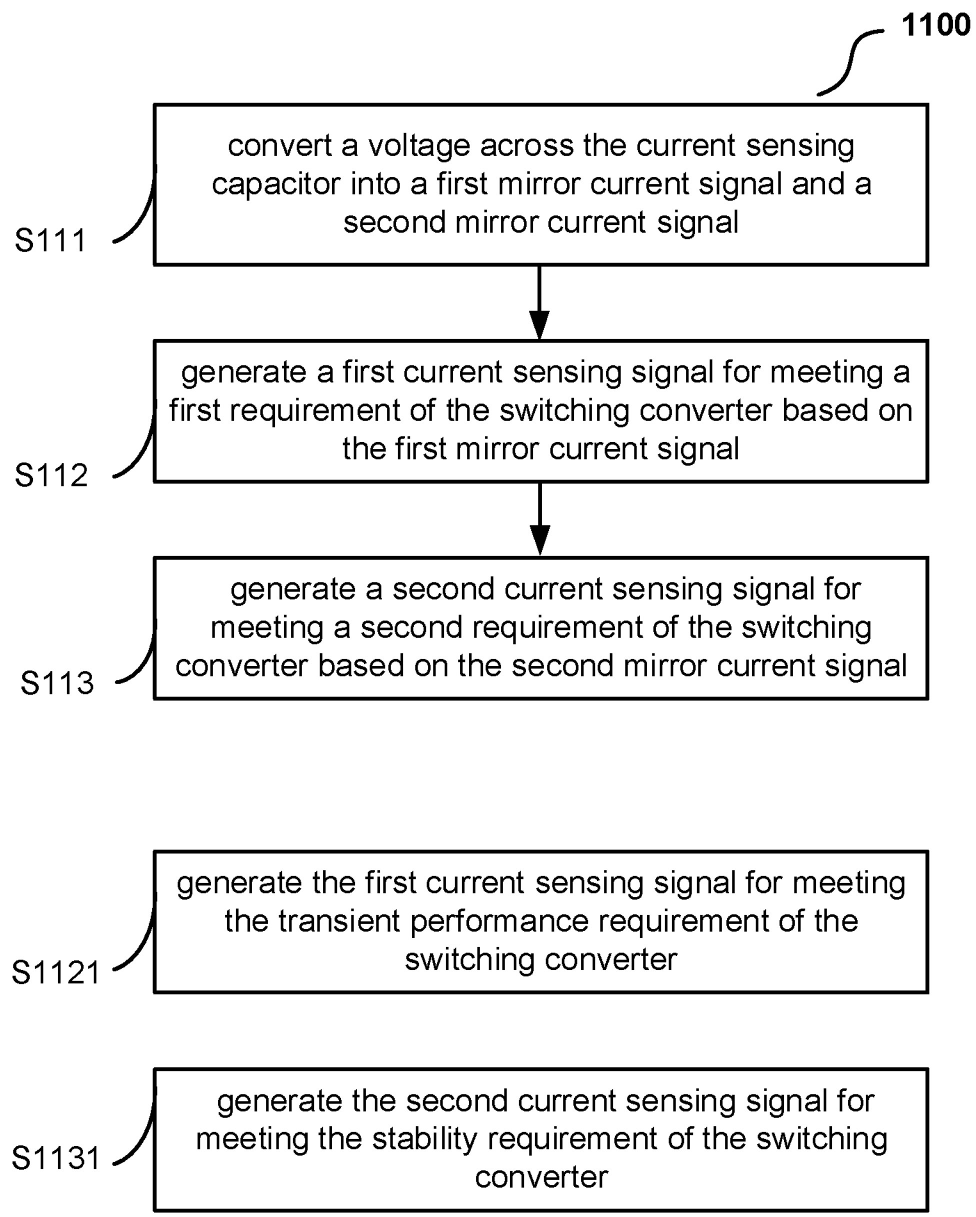
FIG. 11 illustrates a flow chart of DCR current sensing method 1100 in accordance with an embodiment of the present invention.

FIG. 11 illustrates a flow chart of DCR current sensing method 1100 in accordance with an embodiment of the present invention. The DCR current sensing method can be used in a switching converter and includes steps S111~S113, wherein the switching converter comprises a power switch, an inductor, and a current sensing capacitor coupled in series with a current sensing resistor to form a RC circuit, wherein the RC circuit is coupled in parallel with the inductor.

At step S111, a voltage across the current sensing capacitor is converted into a first mirror current signal and a second mirror current signal. In one embodiment, the first mirror current signal and the second mirror current signal both represent the current flowing through the inductor. In one embodiment, the first mirror current signal is equal to the second mirror current signal. In another embodiment, the first mirror current signal is proportional to the second mirror current signal.

At step S112, a first current sensing signal is generated for meeting a first requirement of the switching converter based on the first mirror current signal. In one embodiment, the first requirement comprises the transient performance requirement of the switching converter.

At step S113, a second current sensing signal is generated for meeting a second requirement of the switching converter based on the second mirror current signal. In one embodiment, the second requirement comprises the stability requirement of the switching converter.

Although many detailed circuits are shown in the embodiments above, it is apparent to persons of ordinary skills in the art that, these detailed circuits are only used for illustration purpose only, and are not intended to limit the present invention. Other suitable circuit structure with same or similar function could also be utilized. Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A DCR current sensing circuit used in a switching converter, wherein the switching converter has a power switch and an inductor, and converts an input voltage into an output voltage, the DCR current sensing circuit comprising:

- a current sensing capacitor coupled in series with a current sensing resistor to form a RC circuit, wherein the RC circuit is coupled in parallel with the inductor;
- a current mirror having an input terminal, a first output terminal and a second output terminal, wherein the input terminal is configured to receive a voltage sensing signal indicative of a voltage across the current sensing capacitor, based on the voltage sensing signal, the current mirror generates a first mirror current signal at the first output terminal and a second mirror current signal at the second output terminal;
- a first compensation circuit coupled to the first output terminal of the current mirror to receive the first mirror current signal and configured to generate a first current sensing signal for meeting a first requirement of the switching converter, wherein the first requirement of the switching converter comprises a transient performance requirement; and
- a second compensation circuit coupled to the second output terminal of the current mirror to receive the second mirror current signal and configured to generate a second current sensing signal for meeting a second requirement of the switching converter, wherein the second requirement of the switching converter comprises a stability requirement.

2. The DCR current sensing circuit of claim 1, wherein the first compensation circuit and the second compensation circuit are coupled to a microprocessor unit having a graphical user interface (GUI), wherein the first compensation circuit and the second compensation circuit are configured to receive a compensation instruction from the GUI, and the first compensation circuit generates the first current sensing signal based on the compensation instruction and the first mirror current signal, and the second compensation circuit generates the second current sensing signal based on the compensation instruction and the second mirror current signal.

3. The DCR current sensing circuit of claim 2, wherein the compensation instruction is adjustable based on the first current sensing signal and the second current sensing signal.

4. The DCR current sensing circuit of claim 2, wherein a first compensation control signal having a plurality of first compensation switch control signals is generated based on the compensation instruction, the first compensation circuit comprises:

a first controlled current source having a first terminal and a second terminal, wherein the first terminal is coupled to a power supply and the second terminal is configured to provide a first compensation current signal, the first controlled current source comprises a plurality of branches coupled in parallel, wherein each of the plurality of branches comprises an associated current source and an associated compensation switch coupled in series, wherein the associated compensation switch is controlled by a corresponding first compensation switch control signal; and an first adder having a first terminal, a second terminal and a third terminal, wherein the first terminal is coupled to the second terminal of the first controlled current source to receive the first compensation current signal and the second terminal is configured to receive the first mirror current signal, the first adder is configured to provide the first current sensing signal at the third terminal based on the first compensation current signal and the first mirror current signal.

5. The DCR current sensing circuit of claim 1, further comprising:

an operational amplifier having a first input terminal, a second input terminal and an output terminal, wherein the first and second input terminals are coupled across the current sensing capacitor, the operational amplifier is configured to provide the voltage sensing signal at the output terminal; and wherein the current mirror comprises:

a transistor having a drain terminal, a source terminal and a gate terminal, wherein the source terminal is coupled to the second input terminal of the operational amplifier, and the gate terminal is coupled to the output terminal of the operational amplifier to receive the voltage sensing signal;

a resistor having a first terminal and a second terminal, wherein the first terminal is coupled to the source terminal of the transistor, and the second terminal is coupled to ground; and a mirror current source having a first terminal, a second terminal and a third terminal, wherein the first terminal is coupled to the drain terminal of the transistor, the mirror current source is configured to provide the first mirror current signal at the second terminal and the second mirror current signal at the third terminal.

6. A controller used in a switching converter, wherein the switching converter has a power switch and an inductor, and converts an input voltage into an output voltage, the controller comprising:

a current sensing capacitor coupled in series with a current sensing resistor to form a RC circuit, wherein the RC circuit is coupled in parallel with the inductor;

a current mirror having an input terminal, a first output terminal and a second output terminal, wherein the input terminal is configured to receive a voltage sensing signal indicative of a voltage across the current sensing capacitor, based on the voltage sensing signal, the current mirror generates a first mirror current signal at the first output terminal and a second mirror current signal at the second output terminal;

a first compensation circuit coupled to the first output terminal of the current mirror to receive the first mirror current signal and configured to generate a first current sensing signal for meeting a first requirement of the switching converter, wherein the first requirement of the switching converter comprises a transient performance requirement;

a second compensation circuit coupled to the second output terminal of the current mirror to receive the second mirror current signal and configured to generate a second current sensing signal for meeting a second requirement of the switching converter, wherein the second requirement of the switching converter comprises a stability requirement; and a system controller configured to provide a current reporting signal to a microprocessor unit based on the first current sensing signal, the microprocessor unit is configured to provide a regulation instruction based on the current reporting signal, and wherein the system controller is configured to generate a switch control signal to control the power switch based on the regulation instruction, the second current sensing signal and a feedback voltage signal indicative of the output voltage.

7. The controller of claim 6, wherein the microprocessor unit comprises a GUI, and the first compensation circuit and the second compensation circuit are configured to receive a compensation instruction from the GUI, and the first compensation circuit generates the first current sensing signal based on the compensation instruction and the first mirror current signal, and the second compensation circuit generates the second current sensing signal based on the compensation instruction and the second mirror current signal.

8. The controller of claim 7, wherein the compensation instruction is adjustable based on the first current sensing signal and the second current sensing signal.

9. The controller of claim 7, wherein a second compensation control signal having a plurality of second compensation switch control signals is generated based on the compensation instruction, the second compensation circuit comprises:

a second controlled current source having a first terminal and a second terminal, wherein the first terminal is coupled to a power supply and the second terminal is configured to provide a second compensation current signal, the second controlled current source comprises a plurality of branches coupled in parallel, wherein each of the plurality of branches comprises an associated current source and an associated compensation switch coupled in series, wherein the associated compensation switch is controlled by a corresponding second compensation switch control signal; and an second adder having a first terminal, a second terminal and a third terminal, wherein the first terminal is coupled to the second terminal of the second controlled current source to receive the second compensation current signal, and the second terminal is configured to receive the second mirror current signal, the second adder is configured to provide the second current sensing signal at the third terminal based on the second compensation current signal and the second mirror current signal.

10. The controller of claim 6, further comprising:

an operational amplifier having a first input terminal, a second input terminal and an output terminal, wherein the first and second input terminals are coupled across the current sensing capacitor, the operational amplifier is configured to provide the voltage sensing signal at the output terminal; and wherein the current mirror comprises:

a transistor having a drain terminal, a source terminal and a gate terminal, wherein the source terminal is coupled to the second input terminal of the operational amplifier, and the gate terminal is coupled to the output terminal of the operational amplifier to receive the voltage sensing signal;

a resistor having a first terminal and a second terminal, wherein the first terminal is coupled to the source terminal of the transistor, and the second terminal is coupled to ground; and a mirror current source having a first terminal, a second terminal and a third terminal, wherein the first terminal is coupled to the drain terminal of the transistor, the mirror current source is configured to provide the first mirror current signal at the second terminal and the second mirror current signal at the third terminal.

11. A DCR current sensing method used in a switching converter, wherein the switching converter has a power switch, an inductor, and a current sensing capacitor coupled in series with a current sensing resistor to form a RC circuit, and wherein the RC circuit is coupled in parallel with the inductor, the DCR current sensing method comprising:

converting a voltage across the current sensing capacitor into a first mirror current signal and a second mirror current signal;

generating a first current sensing signal for meeting a first requirement of the switching converter based on the first mirror current signal, wherein the first requirement of the switching converter comprises a transient performance requirement; and generating a second current sensing signal for meeting a second requirement of the switching converter based on the second mirror current signal, wherein the second requirement of the switching converter comprises a stability requirement.

12. The DCR current sensing method of claim 11, further comprising:

respectively generating the first current sensing signal and the second current sensing signal based on a compensation instruction from a GUI.

* * * * *